(No Model.) 2 Sheets—Sheet 1.
W. B. RICKMAN & R. & O. PINTSCH.
SIGNAL LIGHT.
No. 302,032. Patented July 15, 1884.
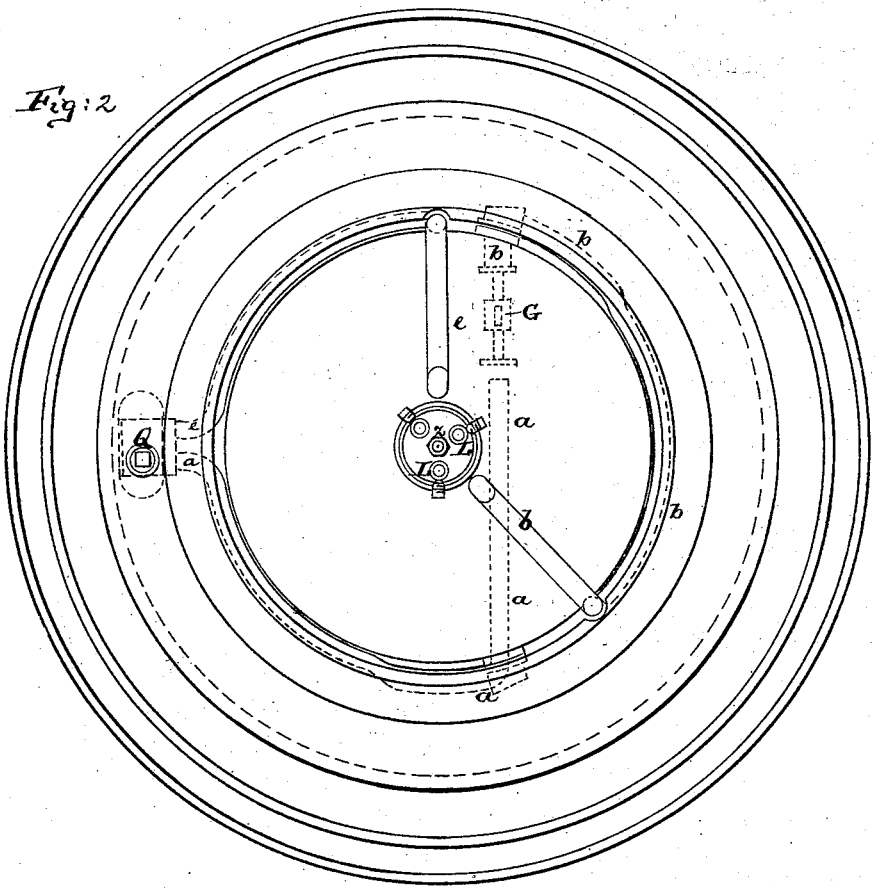
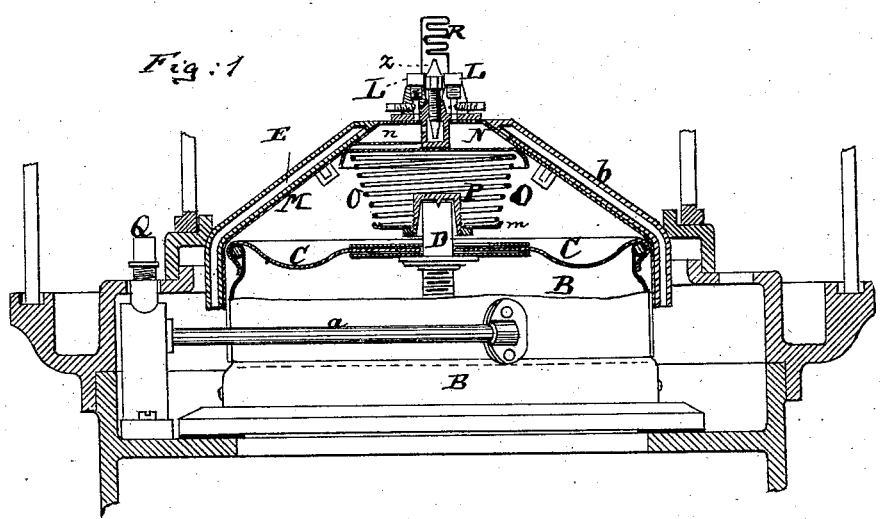
Witnesses:
John M. Speer
August Schlarbaum
Inventors:
Wm. B. Rickman
Richard Pintsch
Oskar Pintsch
by Briesen & Steele
attorneys.

(No Model.) 2 Sheets—Sheet 2.
W. B. RICKMAN & R. & O. PINTSCH.
SIGNAL LIGHT.
No. 302,032. Patented July 15, 1884.
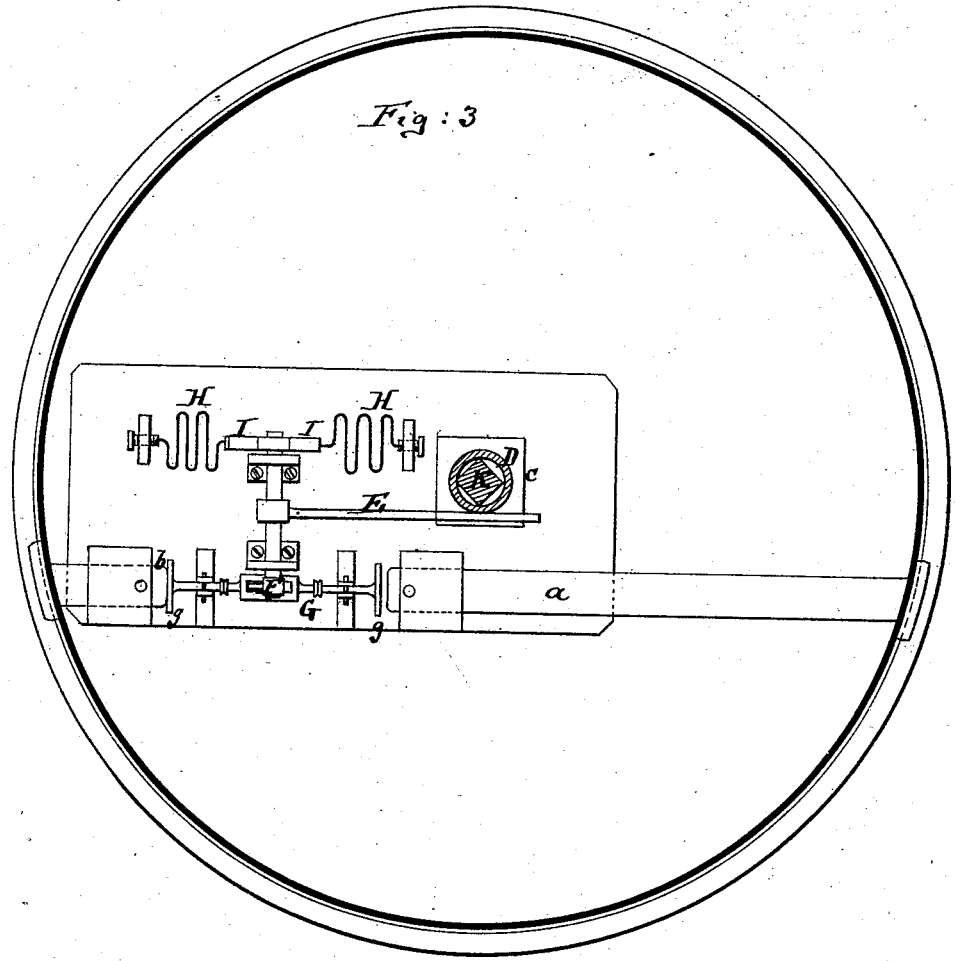
Fig: 3
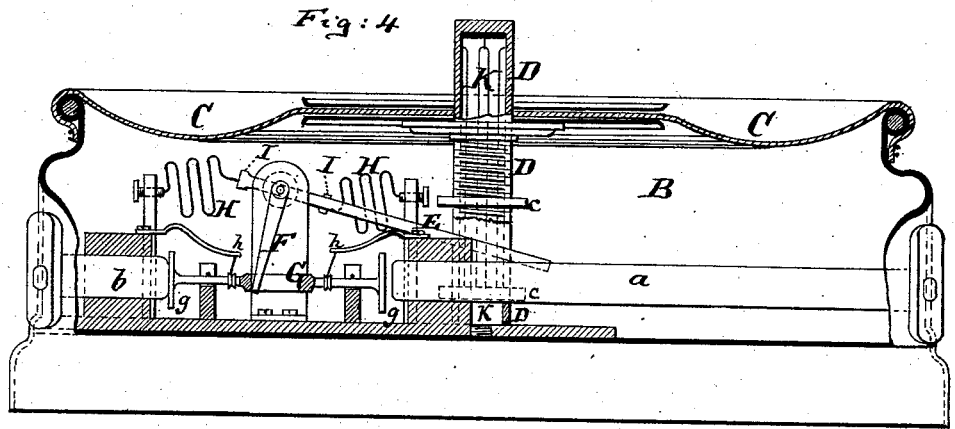
Fig: 4
Witnesses:
John M. Speer.
August Schlarbaum.
Inventors:
Wm. B. Rickman
Richard Pintsch
Oskar Pintsch
by Briesen & Steele
attorneys

UNITED STATES PATENT OFFICE.

WILLIAM BENNETT RICKMAN, OF LONDON, ENGLAND, AND RICHARD PINTSCH AND OSKAR PINTSCH, OF BERLIN, GERMANY, ASSIGNORS, BY MESNE ASSIGNMENTS, TO THE PINTSCH LIGHTING COMPANY, OF NEW JERSEY.

SIGNAL-LIGHT.

SPECIFICATION forming part of Letters Patent No. 302,032, dated July 15, 1884.

Application filed December 14, 1883. (No model.)

*To all whom it may concern:*

Be it known that we, WILLIAM BENNETT RICKMAN, residing at London, England, and RICHARD PINTSCH and OSKAR PINTSCH, both residing at Berlin, Germany, have invented an Improved Flash-Light for Sea-Lanterns, of which the following is a full, clear, and exact description, reference being made to the accompanying drawings.

Sea-lanterns, especially such as are carried by buoys and light-ships, are frequently so situated that it is desirable to provide them with flash-lights—that is to say, with lights that can be seen at intervals only. This we obtain in a gas-light by interrupting the supply of gas at intervals, for which purpose we employ a device which we interpose between the lantern and the pressure-regulator, said device being in substance a vessel having movable walls, so that its contents will be variable. From this vessel the main burners of the lantern are supplied with gas, and the movement of its walls, which takes place in filling and emptying this vessel, we utilize for the purpose of temporarily closing the gas-supply to the burners, as hereinafter more clearly described. The burners are all relighted by a constant igniting-flame, which is not interfered with by the apparatus which regulates the display of light.

Figure 1 in the accompanying drawings is a vertical central section of the lower part of the lantern having our improvement. Fig. 2 is a top view of the same. Fig. 3 is a detailed top view, partly in section, of the apparatus for regulating the supply of gas to the lighting-burners; and Fig. 4 is a central section of the same, Figs. 3 and 4 being on a larger scale than Figs. 1 and 2.

The mechanism necessary for controlling the supply of gas to the main burners is preferably placed in the vessel B, which is protected by the surrounding walls of the lantern from all external injurious influences. On top this vessel B is closed by a membrane, C. A pipe, $a$, supplies the vessel B with gas. Another pipe, $b$, conveys the gas from the vessel B to the main burners L. Figs. 3 and 4 show that the ends of the pipes $a$ and $b$ are aligned within the chamber B, and between them is placed a sliding rod, G, having terminal disks $g$, which can be thrown alternately against the ends of said pipes $a$ and $b$. The rod G is reciprocated by the movement of the membrane C. To this end the membrane C carries in its center a vertical tube, D, which is closed at its upper end, and which fits on a pin, K, that projects upwardly from the rigid bottom of the vessel B. Within the vessel B the tube D is threaded, and carries two collars, $c$ $c$, which are screwed upon it at proper distances apart, and which can be adjusted as occasion may require.

In the vessel B is pivoted to a suitable standard a lever, E, which has a toe, F, that enters a slot in the rod G, the end of the lever E being between the disks $c$ $c$. The lever E also has two projections, I I, that connect with springs H H, as shown.

The apparatus operates as follows: In the position of parts shown in Fig. 4 the pipe $a$ is opened and the pipe $b$ closed; hence the membrane C will rise as gas enters the vessel B until the lower disk $c$ strikes the lever E and swings it up until after it has passed the horizontal position, whereupon the springs H H, which are contracted by this movement, will, in their endeavor to expand, continue the motion of the lever E in the upward direction, until, finally, the rod G is pushed so as to close the pipe $a$ and open the pipe $b$. Now the gas escapes to the burners and the membrane sinks, thereby causing the upper disk $c$ to strike the lever E, until, finally, the rod G will be pushed to close the pipe $b$ and open the pipe $a$. As already stated, during the first half of the movement of the lever E the springs H H are contracted. During the second half of the same movement they expand, thereby giving to the rod G a sudden motion and causing a quick closing and opening of the pipes $a$ and $b$. Small friction-springs $h$ bear gently upon the rod G and hold it in its proper place, so as to prevent said rod from leaving its proper position spontaneously during the rocking motion of the buoy or from other unforeseen cause; yet said springs do not prevent said rod G from being moved by the toe F of the lever E.

The chamber B is cut off from all communication with the gas-supply pipe $a$, while the pipe $b$ feeds the burners. In order to obtain the proper burning-pressure, a spring, O, is placed on the membrane C. This spring bears upon a flange, $m$, of the tube D, and is compressed against the upper cap, M, when the membrane is raised, assisting in depressing the membrane at the time the gas escapes to the burners. In order to centralize this pressure of the spring O, we prefer to form the flange $m$ on a cap, P, which has on its inner side a central downwardly-projecting pin that rests on the center of the tube D, as is indicated in Fig. 1. The pipe $b$ enters a chamber, N, which is formed in the upper part of the cap-like structure M, that carries the burners L, as indicated in Fig. 1, said burners communicating with said chamber N. Right between these burners L is the igniting-burner $z$, which receives its supply of gas direct through a chamber, $n$, and pipe $e$ from the regulator or suitable gas-reservoir, so that it will always be lighted. This little igniting-burner $z$ enters the chamber $n$, and is screwed into it to greater or lesser depth, according as its lower end is nearer to or farther from the bottom of the chamber $n$, which will admit less or more gas to said burner.

To regulate the duration of the respective periods during which the main burners should be lighted, the gas is first excluded from the pipe $a$ by a screw-valve, Q, whereupon proper experiments can be made to determine the position of the disks $c$.

In order to guard against accidental extinction of the igniting-flame from external causes, we place above it a spiral, R, of platinum, either in form of a fine wire or strip, which is constantly kept glowing by the flame, and which, if the flame should be momentarily extinguished, will serve to relight it so soon as the gas again flows through the burner. This spiral also assists in lighting the main burners L.

We claim—

1. In a sea-lantern, the main burner or burners L, combined with the pipe $b$, gas-supply chamber B, and gas-supply pipe $a$, and with means for alternately opening and closing the pipe $a$, that leads into said chamber B, substantially as described.

2. The combination of the chamber B, having membrane C, with the tube D, disks $c$, lever E F, rod G, and pipes $a$ $b$, substantially as specified.

3. The combination of the pipe $a$ with the chamber B, membrane C, tube D, disks $c$, lever E F, springs H, rod G, pipe $b$, burners L, pipe $e$, and igniting-burners $z$, as set forth.

4. The combination of the chamber B, its membrane C, and tube D with the upper spring, O, pipe $a$, and means, substantially as described, for intermittently closing said pipe $a$, as specified.

5. The combination of the main burners L and igniting-burners $z$ with the platinum spiral R, placed above the igniting-burner, substantially as specified.

6. The combination of the gas-supply pipe $a$ with the chamber B, having flexible wall or walls, pipe $b$, burner or burners L, pipe $e$, burner $z$, and with means, substantially as described, for alternately closing the pipes $a$ $b$ within the chamber B by mechanism connected with its flexible wall or walls, as set forth.

W. B. RICKMAN.
RICHARD PINTSCH.
OSKAR PINTSCH.

Witnesses as to Richard Pintsch and Oskar Pintsch:
B. ROI,
JOHN R. ROSLYN.

Witnesses as to William Bennett Rickman:
O. VERUÈDE,
*Solr.*, 10 *New Broad Street, London, E. C., a commissioner to administer oaths in the Supreme Court of Judicature in England.*
E. CATTERMOLE,
*His clerk.*